United States Patent
Tsukada et al.

(10) Patent No.: US 11,814,318 B2
(45) Date of Patent: Nov. 14, 2023

(54) FERRITE SINTERED BODY AND COIL COMPONENT

(71) Applicant: Murata Manufacturing Co., Ltd., Kyoto-fu (JP)

(72) Inventors: Yuichiro Tsukada, Nagaokakyo (JP); Yuko Fujita, Nagaokakyo (JP); Takanori Suzuki, Nagaokakyo (JP); Atsushi Shimamura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 241 days.

(21) Appl. No.: 17/469,789

(22) Filed: Sep. 8, 2021

(65) Prior Publication Data

US 2022/0098114 A1 Mar. 31, 2022

(30) Foreign Application Priority Data

Sep. 29, 2020 (JP) .................. 2020-163626

(51) Int. Cl.
| | |
|---|---|
| *C04B 35/26* | (2006.01) |
| *H01F 1/34* | (2006.01) |
| *H01F 3/10* | (2006.01) |
| *H01F 5/00* | (2006.01) |
| *H01F 27/255* | (2006.01) |

(52) U.S. Cl.
CPC ........ *C04B 35/2625* (2013.01); *C04B 35/265* (2013.01); *H01F 1/344* (2013.01); *H01F 3/10* (2013.01); *H01F 5/00* (2013.01); *C04B 2235/3217* (2013.01); *C04B 2235/3241* (2013.01); *C04B 2235/3244* (2013.01); *C04B 2235/3265* (2013.01); *C04B 2235/3279* (2013.01); *C04B 2235/3281* (2013.01); *C04B 2235/3284* (2013.01); *C04B 2235/34* (2013.01); *H01F 27/255* (2013.01)

(58) Field of Classification Search
CPC ... H01F 1/344; H01F 5/00; H01F 3/00; C04B 35/265; C04B 2235/3217; C04B 2235/3241; C04B 2235/3246; C04B 2235/3265; C04B 2235/3279; C04B 2235/3281; C04B 2235/3284
See application file for complete search history.

(56) References Cited

U.S. PATENT DOCUMENTS

2005/0199852 A1* 9/2005 Takenoshita ............ H01F 1/344
252/62.62

FOREIGN PATENT DOCUMENTS

| JP | 2001-151564 A | 6/2001 |
|---|---|---|
| JP | 2006-206415 A | 8/2006 |

* cited by examiner

*Primary Examiner* — C Melissa Koslow
(74) *Attorney, Agent, or Firm* — Studebaker & Brackett PC (57) ABSTRACT

A ferrite sintered body contains Fe, Mn, Zn, Cu, and Ni. Supposing that Fe, Mn, Zn, Cu, and Ni are converted into $Fe_2O_3$, $Mn_2O_3$, ZnO, CuO, and NiO, respectively, and the sum of the contents of $Fe_2O_3$, $Mn_2O_3$, ZnO, CuO, and NiO is 100 mol %, the sum of the contents of $Fe_2O_3$ and $Mn_2O_3$ is 48.47 mol % to 49.93 mol %, the content of $Mn_2O_3$ is 0.07 mol % to 0.37 mol %, the content of ZnO is 28.95 mol % to 33.50 mol %, and the content of CuO is 2.98 mol % to 6.05 mol %. Furthermore, 102 ppm to 4,010 ppm Zr in terms of $ZrO_2$ and 10 ppm to 220 ppm Al in terms of $Al_2O_3$ are contained per 100 parts by weight of the sum of the amounts of contained $Fe_2O_3$, $Mn_2O_3$, ZnO, CuO, and NiO.

8 Claims, 3 Drawing Sheets

FERRITE SINTERED BODY AND COIL COMPONENT

CROSS-REFERENCE TO RELATED APPLICATION

This application claims benefit of priority to Japanese Patent Application No. 2020-163626, filed Sep. 29, 2020, the entire content of which is incorporated herein by reference.

BACKGROUND

Technical Field

The present disclosure relates to a ferrite sintered body and a coil component.

Background Art

As material of a ferrite sintered body for use in coil components, Japanese Unexamined Patent Application Publication No. 2006-206415 (hereinafter referred to as the patent document) discloses ferrite containing, as a main component, iron oxide, zinc oxide, nickel oxide, and copper oxide. The content of each oxide in 100 mol % of the main component is as follows: the content of iron oxide is 49.15 mol % to 49.65 mol % in terms of $Fe_2O_3$, the content of zinc oxide is 32.35 mol % to 32.85 mol % in terms of ZnO, the content of nickel oxide is 11.90 mol % to 12.30 mol % in terms of NiO, and the content of copper oxide is 5.25 mol % to 6.55 mol % in terms of CuO.

According to the patent document, adjusting the composition of the main component to the above range allows ferrite with a Curie point of 100° C. or higher and a magnetic permeability of 2,300 or more (preferably 2,500 or more) to be obtained.

However, there are no materials satisfying high strength in addition to high magnetic permeability and high Curie point at present.

SUMMARY

Accordingly, the present disclosure provides a ferrite sintered body having high magnetic permeability, high Curie point, and high strength. Furthermore, the present disclosure provides a coil component including the ferrite sintered body as a magnetic core.

According to a preferred embodiment of the present disclosure, a ferrite sintered body contains Fe, Mn, Zn, Cu, and Ni. Supposing that Fe, Mn, Zn, Cu, and Ni are converted into $Fe_2O_3$, $Mn_2O_3$, ZnO, CuO, and NiO, respectively, and the sum of the contents of $Fe_2O_3$, $Mn_2O_3$, ZnO, CuO, and NiO is 100 mol %, the sum of the contents of $Fe_2O_3$ and $Mn_2O_3$ is 48.47 mol % to 49.93 mol %, the content of $Mn_2O_3$ is 0.07 mol % to 0.37 mol %, the content of ZnO is 28.95 mol % to 33.50 mol %, and the content of CuO is 2.98 mol % to 6.05 mol %. Furthermore, 102 ppm to 4,010 ppm Zr in terms of $ZrO_2$ and 10 ppm to 220 ppm Al in terms of $Al_2O_3$ are contained per 100 parts by weight of the sum of the amounts of contained $Fe_2O_3$, $Mn_2O_3$, ZnO, CuO, and NiO. In a cross section of the ferrite sintered body, the area fraction of pores and the area fraction of segregations containing Cu are 2.0% or less.

According to a preferred embodiment of the present disclosure, a coil component includes the ferrite sintered body as a magnetic core.

According to the present disclosure, a ferrite sintered body having high magnetic permeability, high Curie point, and high strength can be provided.

Other features, elements, characteristics and advantages of the present disclosure will become more apparent from the following detailed description of preferred embodiments of the present disclosure with reference to the attached drawings.

DETAILED DESCRIPTION

An embodiment of the present disclosure are described below.

The present disclosure is not limited to configurations below. Various modifications can be made without departing from the gist of the present disclosure. Combinations of two or more individual configurations preferred in the present disclosure as described below are also included in the present disclosure.

Ferrite Sintered Body

A ferrite sintered body according to the present disclosure contains Fe, Mn, Zn, Cu, and Ni.

In the ferrite sintered body according to the present disclosure, supposing that Fe, Mn, Zn, Cu, and Ni are converted into $Fe_2O_3$, $Mn_2O_3$, ZnO, CuO, and NiO, respectively, and the sum of the contents of $Fe_2O_3$, $Mn_2O_3$, ZnO, CuO, and NiO is 100 mol %, the sum of the contents of $Fe_2O_3$ and $Mn_2O_3$ is about 48.47 mol % to about 49.93 mol %, the content of $Mn_2O_3$ is about 0.07 mol % to about 0.37 mol %, the content of ZnO is about 28.95 mol % to about 33.50 mol %, and the content of CuO is about 2.98 mol % to about 6.05 mol %.

In the present specification, the term "$Fe_2O_3+Mn_2O_3$" refers to the sum of the contents of $Fe_2O_3$ and $Mn_2O_3$.

The content of each of Fe, Mn, Zn, Cu, and Ni can be measured by the X-ray fluorescence (XRF) analysis of the ferrite sintered body.

The ferrite sintered body according to the present disclosure further contains about 102 ppm to about 4,010 ppm Zr in terms of $ZrO_2$ and about 10 ppm to about 220 ppm Al in terms of $Al_2O_3$ per 100 parts by weight of the sum of the amounts of contained $Fe_2O_3$, $Mn_2O_3$, ZnO, CuO, and NiO.

The content of each of Zr and Al can be measured by the inductively coupled plasma (ICP) emission analysis of the ferrite sintered body.

In the ferrite sintered body according to the present disclosure, adjusting the composition of ferrite to the above range allows an appropriate liquid phase promoting sintering to be produced; hence, the adjustment of the course of sintering is easy and grain growth is appropriately promoted. As a result, the magnetic permeability µ can be effectively increased.

In a cross section of the ferrite sintered body according to the present disclosure, the area fraction of pores (hereinafter simply referred to as "pore fraction") is about 2.0% or less and the area fraction of segregations containing Cu (hereinafter simply referred to as "Cu segregation fraction") is about 2.0% or less.

In the ferrite sintered body according to the present disclosure, adjusting the pore fraction and the Cu segregation fraction to the above ranges in addition to adjusting the composition of ferrite to the above range enables the number of pores and Cu segregations which are hindrances to domain wall motion to be reduced and also enables the thickness of a Cu layer forming a grain boundary layer hindering the passage of magnetic flux to be minimized. As a result, the magnetic permeability μ can be synergistically increased.

The number of Cu segregations having a difference in thermal shrinkage percentage decreases during calcination or in the course of cooling and therefore the ferrite sintered body is unlikely to be micro-cracked. Therefore, the number of pores serving as origins of fracture can be reduced and the thickness of a grain boundary layer likely to serve as an origin of fracture or likely to cause the development of cracks can be minimized, thereby allowing the ferrite sintered body to have high strength.

The pore fraction can be calculated from the area fraction of portions that are recognized as pores in such a manner that an image of a cross section of the ferrite sintered body photographed using a scanning electron microscope (SEM) is binarized and is analyzed.

The Cu segregation fraction can be calculated from the area fraction of portions in which 10 atm % or more Cu is present in such a manner that the distribution of each element in the same cross section as that used to determine the pore fraction is confirmed by scanning electron microscopy/wavelength-dispersive X-ray (SEM/WDX) analysis.

As described above, adjusting the pore fraction and the Cu segregation fraction to the above ranges in addition to adjusting the composition of ferrite to the above range allows the ferrite sintered body to have high magnetic permeability, high Curie point, and high strength.

The ferrite sintered body according to the present disclosure may further contain P, Cr, and S.

The ferrite sintered body according to the present disclosure preferably further contains about 5 ppm to about 50 ppm P in terms of $P_2O_5$, about 10 ppm to about 305 ppm Cr in terms of $Cr_2O_3$, and about 5 ppm to about 108 ppm S per 100 parts by weight of the sum of the amounts of contained $Fe_2O_3$, $Mn_2O_3$, ZnO, CuO, and NiO. In a cross section of the ferrite sintered body, the pore fraction is preferably about 1.0% or less.

When P, Cr, and S are contained in the above ranges, a liquid phase is formed in a low-temperature range and therefore grain growth is promoted in a low-temperature range. Therefore, the magnetic permeability μ can be further increased. As described above, promoting grain growth is effective in increasing the magnetic permeability μ. However, when the amount of the liquid phase formed for the purpose of promoting grain growth is too large, grain growth occurs rapidly, leading to abnormal grain growth, which is not preferable. In this case, the difference in luminance between a portion in which grain growth has proceeded and a portion in which grain growth has not proceeded is large, leading to a failure that it is difficult to judge a flaw in appearance inspection or the like. When P, Cr, and S are contained in the above ranges, abnormal grain growth is suppressed and therefore an appearance failure is readily recognized in appearance inspection.

Furthermore, adjusting the pore fraction to about 1.0% or less in addition to appropriately regulating the grain size distributes a mechanical load over the ferrite sintered body, thereby enabling the strength to be increased.

The content of each of P and Cr can be measured by the ICP emission analysis of the ferrite sintered body. The content of S can be measured in such a manner that the ferrite sintered body is analyzed by combustion-infrared absorption spectrometry in accordance with JIS G 1215-4: 2010.

In a cross section of the ferrite sintered body according to the present disclosure, it is preferable that there are no pores not smaller than about 5 μm in terms of equivalent circle diameter and the number of pores not larger than about 2 μm in terms of equivalent circle diameter accounts for about 90% or more of the number of all pores.

Even when the pore fraction is the same, pores with a smaller size make a smaller contribution to a reduction in strength. Thus, when there are no pores not smaller than about 5 μm in terms of equivalent circle diameter and the number of pores not larger than about 2 μm in terms of equivalent circle diameter accounts for about 90% or more of the number of all pores, the ferrite sintered body has increased strength.

The equivalent circle diameter of each pore can be measured in such a manner that a cross section of the ferrite sintered body is photographed using a SEM, followed by image processing of the image.

The ferrite sintered body according to the present disclosure is preferably manufactured as described below. An example of a method for manufacturing the ferrite sintered body, which contains Fe, Mn, Zn, Cu, Ni, Zr, Al, P, Cr, and S, is described below.

First, raw materials of components are weighed so as to give predetermined percentages after calcination. The raw materials are all wet-mixed using a ball mill or a bead mill. After a dispersion medium such as water is removed from the mixture, the mixture is pre-calcined at a temperature of, for example, about 650° C. to about 900° C., whereby a pre-calcined powder is obtained.

Raw materials of components used other than P and S are oxides. Components such as $ZrO_2$, $Al_2O_3$, $P_2O_5$, $Cr_2O_3$, and S are weighed with respect to 100 parts by weight of the sum of the amounts of contained $Fe_2O_3$, $Mn_2O_3$, ZnO, CuO, and NiO and are mixed together. 100 ppm is equal to 0.01 parts by weight. Powders of oxides for $ZrO_2$, $Al_2O_3$, and $Cr_2O_3$, a diluted aqueous solution such as an aqueous solution of phosphoric acid for $P_2O_5$, and a dispersant such as a sulfonic acid-based dispersant for S are added, whereby the amounts of the added components are adjusted.

After the pre-calcined powder is crushed using a ball mill or a bead mill such that a predetermined specific surface area (for example, about 2 $m^2/g$ to about 7 $m^2/g$) is obtained, a binder such as polyvinyl alcohol (PVA), an acrylic binder, or a butyral binder (the preferable usage is about 1% by weight to about 10% by weight) and a plasticizer such as diglycerol, a phthalic acid-based plasticizer, or a glycerin oligomer are added to the pre-calcined powder, followed by preparing a granulated powder by spray granulation. The granulated powder may be prepared by passing slurry evaporated to dryness through a mesh instead of spray granulation. The mean particle size D50 of the granulated powder is, for example, about 20 μm to about 100 μm.

The obtained granulated powder is press-molded into a predetermined core shape. The molding pressure is, for example, about 200 MPa to about 1,000 MPa. As the molding pressure is higher, the occurrence of coarse pores after calcination can be further suppressed.

After the obtained molded body is degreased, the molded body is calcined, whereby the ferrite sintered body is obtained.

As calcination is performed at lower temperature for a longer time, the occurrence of micropores can be further suppressed. Therefore, the number of pores not larger than about 2 μm in terms of equivalent circle diameter can be adjusted by varying the holding time or the calcination temperature. When the calcination temperature is too low, the holding time in a calcination temperature range is long (for example, at about 900° C. for about 15 hours). However, when the calcination temperature is too high, the volatilization of ZnO and CuO proceeds, the composition (mainly the ratio between $Fe_2O_3$, $Mn_2O_3$, ZnO, CuO, and NiO) of the ferrite sintered body shifts, and therefore it is difficult to control characteristics, though the calcination time can be reduced. Therefore, calcination is performed in such a manner that the practical temperature range is set to about 910° C. to about 1,150° C. (the top temperature) and the holding time at the top temperature is set to about one hour to about 10 hours.

Incidentally, the amount of segregated CuO can be adjusted by adjusting the amount of added Cu or the concentration of oxygen during calcination, thereby enabling the Cu segregation fraction to be adjusted. In particular, the increase in amount of added Cu increases the amount of segregated CuO and the increase in concentration of oxygen during calcination reduces the amount of segregated CuO.

As described above, the ferrite sintered body according to the present disclosure is obtained.

Examples disclosing ferrite sintered bodies according to the present disclosure in detail are described below. The present disclosure is not limited to the examples only.

Preparation of Ferrite Sintered Body (1) Raw materials of components were weighed so as to give percentages shown in Table 1 after calcination. The raw materials were all wet-mixed in water using a ball mill. After water was removed from the mixture, the mixture was pre-calcined, whereby a pre-calcined powder was obtained. In the examples, calcination was performed in air at 800° C. for two hours.

Raw materials of components used other than P and S were oxides. Components such as $ZrO_2$, $Al_2O_3$, $P_2O_5$, $Cr_2O_3$, and S were weighed with respect to 100 parts by weight of the sum of the amounts of contained $Fe_2O_3$, $Mn_2O_3$, ZnO, CuO, and NiO and were mixed together. Powders of oxides for $ZrO_2$, $Al_2O_3$, and $Cr_2O_3$, a diluted aqueous solution such as an aqueous solution of phosphoric acid for $P_2O_5$, and a dispersant such as a alkylsulfonic acid-based dispersant for S were added, whereby the amounts of the added components were adjusted.

(2) After the pre-calcined powder was crushed using a ball mill such that the specific surface area was 2 $m^2$/g to 3 $m^2$/g, PVA serving as a binder (the usage was 3% by weight) and diglycerol serving as a plasticizer were added to the pre-calcined powder, followed by preparing a granulated powder by spray granulation. The mean particle size D50 of the granulated powder was 20 μm to 100 μm.

(3) The obtained granulated powder was press-molded into a predetermined core shape. The molding pressure was 200 MPa to 1,000 MPa. In the examples, core shapes used were a toroidal shape having an inside diameter of 12 mm, an outside diameter of 20 mm, and a thickness of 2 mm and a plate shape having a size of 36 mm×4 mm with a thickness of 3 mm as measured before calcination. In some samples, those to which hollow particles or particles having a large depression like a navel were added were press-molded such that coarse pores not smaller than 5 μm in terms of equivalent circle diameter remained after calcination.

(4) After the obtained molded body was degreased, the molded body was calcined, whereby a ferrite sintered body was obtained. Degreasing conditions included 450° C., five hours, and an aerial mode. Calcination conditions included an aerial mode except Sample 79 and an oxygen concentration of 0.5% by volume for Sample 79. Calcination was performed at an arbitrary temperature in such a manner that the practical temperature range was set to 910° C. to 1,150° C. (the top temperature) and the holding time at the top temperature was set to one hour to 10 hours as described above.

Relative Permeability and Curie point

A Cu wire was wound around a ferrite sintered body, obtained after calcination, having a toroidal shape 20 times. The relative permeability μ was measured at 25° C. and 100 kHz and temperature characteristics of the relative permeability were measured at 100 kHz using an impedance analyzer (Type 4294A, manufactured by Keysight Technologies Inc.). Furthermore, the Curie point was calculated in accordance with JIS C 2560-2.

Three-Point Bending Strength

A plate-shaped ferrite sintered body obtained after calcination was measured for three-point bending strength in accordance with JIS R 1601:2008.

Content of Each Component

For each sample, a cross section in the vicinity of the center of a ferrite sintered body was polished, two arbitrary locations in the polished cross section were measured by XRF analysis, and the content of each of Fe, Mn, Zn, Cu, and Ni was determined from the average of the measurements. The content of each of Zr, Al, P, and Cr was measured by the ICP emission analysis of the ferrite sintered body. The content of S was measured in such a manner that the ferrite sintered body was analyzed by combustion-infrared absorption spectrometry in accordance with JIS G 1215-4:2010. The content of each component is shown in Table 1. For the content of each component other than S, a value in terms of an oxide is shown in Table 1.

Pore Fraction

For each sample, a cross section in the vicinity of the center of a ferrite sintered body was polished, an image obtained by photographing the cross section at 3,000× magnification using a SEM was binarized and was analyzed, and the area fraction of portions recognized as pores was determined. The cross section was photographed in five arbitrary fields of view, followed by calculating the pore fraction from the average. The pore fraction of each sample is shown in Table 1.

Figure 1:
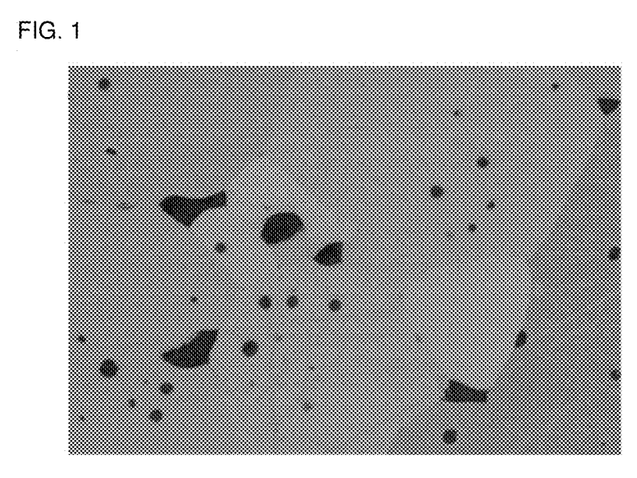
FIG. 1 a SEM image of a cross section of Sample 36.

FIG. 1 a SEM image of a cross section of Sample 36. The pore fraction of Sample 36 is 4.0%.

Figure 2:
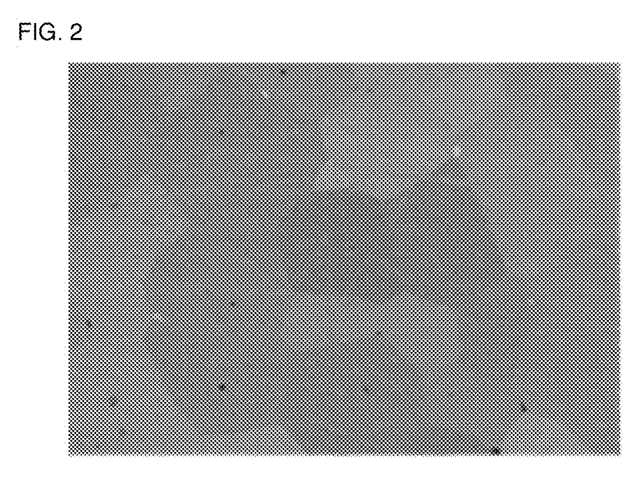
FIG. 2 is a SEM image of a cross section of Sample 6.

FIG. 2 a SEM image of a cross section of Sample 6. The pore fraction of Sample 6 is 0.1%.

Cu Segregation Fraction

For the same polished cross section as that used to determine the pore fraction, the distribution of each element was investigated by SEM/WDX analysis at an accelerating voltage of 20 kV in a 20 μm×20 μm field of view and the area fraction of a portion in which 10 atom % or more Cu was present was determined. The polished cross section was photographed in five arbitrary fields of view, followed by calculating the Cu segregation fraction from the average. The Cu segregation fraction of each sample is shown in Table 1.

Figure 3:
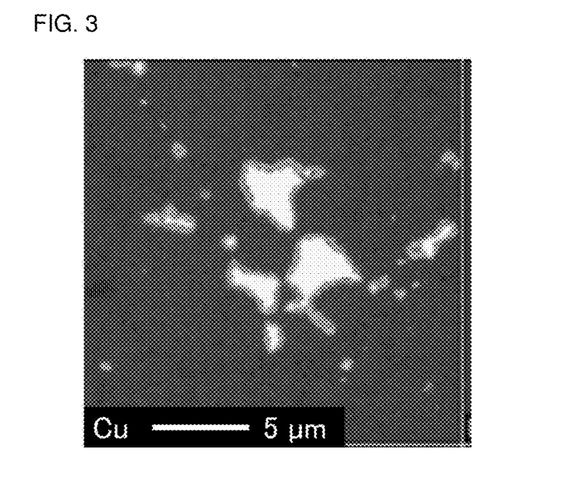
FIG. 3 is a mapping image of Cu in Sample 41.

FIG. 3 is a mapping image of Cu in Sample 41. The Cu segregation fraction of Sample 41 is 4.5%.

Figure 4:
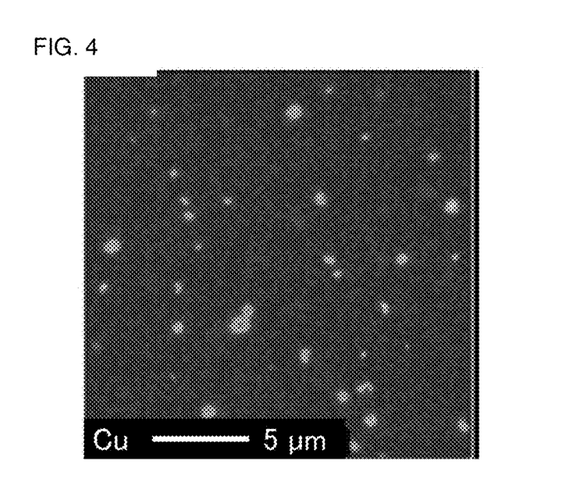
FIG. 4 is a mapping image of Cu in Sample 39.

FIG. 4 is a mapping image of Cu in Sample 39. The Cu segregation fraction of Sample 39 is 1.0%.

Distribution of Equivalent Circle Diameter of Pores

For each sample, a cross section in the vicinity of the center of a ferrite sintered body was polished, an image was obtained by photographing the cross section at 1,000× magnification using a SEM, and a 100 μm×100 μm area was image-processed, whereby the distribution of the equivalent circle diameter of pores was measured. The distribution of the equivalent circle diameter of pores was measured in five arbitrary fields of view, whereby the presence or absence of pores not smaller than 5 μm in terms of equivalent circle diameter was judged and the percentage of the number of pores not larger than 2 μm in terms of equivalent circle diameter in the number of all pores was calculated. Results are shown in Table 1.

Abnormal Grain Growth

For each sample, the suppression of abnormal grain growth was judged by a method below. The appearance of a ferrite sintered body was investigated in five fields of view. A case where the diameter of the largest grain was 30 μm to 90 μm was judged good and a case where the diameter of the largest grain was less than 30 μm was judged excellent. Results are shown in Table 1.

TABLE 1

| Sample | $Fe_2O_3 + Mn_2O_3$ mol % | $Fe_2O_3$ mol % | $Mn_2O_3$ mol % | ZnO mol % | CuO mol % | NiO mol % | $ZrO_2$ ppm | $Al_2O_3$ ppm | Pore fraction % | Cu segregation fraction % | $P_2O_5$ ppm | $Cr_2O_3$ ppm |
|---|---|---|---|---|---|---|---|---|---|---|---|---|
| *1 | 47.00 | 46.80 | 0.20 | 29.99 | 3.02 | Balance | 1950 | 49 | 1.2 | 2.0 | 10 | 65 |
| 2 | 48.47 | 48.26 | 0.21 | 29.00 | 3.02 | Balance | 2010 | 39 | 1.0 | 1.0 | 17 | 79 |
| 3 | 49.02 | 48.81 | 0.21 | 29.00 | 3.01 | Balance | 1990 | 44 | 0.8 | 0.5 | 13 | 72 |
| 4 | 49.21 | 49.00 | 0.21 | 30.03 | 3.01 | Balance | 1980 | 36 | 0.8 | 0.1 | 16 | 68 |
| 5 | 49.40 | 49.19 | 0.21 | 30.02 | 2.98 | Balance | 2020 | 45 | 0.1 | 0.1 | 25 | 72 |
| 6 | 49.61 | 49.39 | 0.22 | 30.01 | 3.01 | Balance | 1980 | 35 | 0.1 | 0.1 | 27 | 78 |
| 7 | 49.93 | 49.71 | 0.22 | 30.03 | 2.98 | Balance | 2010 | 46 | 1.4 | 0.0 | 17 | 71 |
| *8 | 50.05 | 49.83 | 0.22 | 30.01 | 3.00 | Balance | 1890 | 35 | 2.0 | 0.5 | 16 | 74 |
| *9 | 49.15 | 48.93 | 0.21 | 28.00 | 2.99 | Balance | 1990 | 48 | 1.3 | 0.8 | 20 | 76 |
| 10 | 49.14 | 48.93 | 0.21 | 29.00 | 3.01 | Balance | 2010 | 50 | 1.1 | 0.8 | 28 | 78 |
| 11 | 49.08 | 48.87 | 0.21 | 32.02 | 3.01 | Balance | 2060 | 39 | 1.4 | 0.8 | 8 | 71 |
| 12 | 49.10 | 48.88 | 0.21 | 33.50 | 3.01 | Balance | 1980 | 43 | 1.5 | 0.8 | 18 | 78 |
| *13 | 49.08 | 48.87 | 0.21 | 35.00 | 2.99 | Balance | 1980 | 43 | 1.4 | 0.8 | 10 | 71 |
| *14 | 49.13 | 48.92 | 0.21 | 42.00 | 3.01 | Balance | 2010 | 33 | 1.5 | 0.8 | 21 | 72 |
| *15 | 49.10 | 48.89 | 0.21 | 30.01 | 0.00 | Balance | 1980 | 38 | 4.5 | 0.0 | 16 | 79 |
| 16 | 49.11 | 48.90 | 0.21 | 30.01 | 3.02 | Balance | 1970 | 49 | 1.5 | 0.1 | 10 | 71 |
| 17 | 49.09 | 48.88 | 0.21 | 29.98 | 3.99 | Balance | 2010 | 44 | 1.0 | 0.1 | 11 | 71 |
| 18 | 49.08 | 48.87 | 0.21 | 29.98 | 6.05 | Balance | 2000 | 44 | 0.8 | 0.5 | 20 | 73 |
| *19 | 49.13 | 48.92 | 0.21 | 30.03 | 8.00 | Balance | 1990 | 47 | 0.8 | 2.5 | 13 | 65 |
| *20 | 49.13 | 48.92 | 0.21 | 29.51 | 3.99 | Balance | 50 | 46 | 1.5 | 1.5 | 18 | 71 |
| 21 | 49.08 | 48.87 | 0.21 | 29.51 | 4.01 | Balance | 102 | 31 | 2.0 | 0.7 | 20 | 73 |
| 22 | 48.97 | 48.76 | 0.21 | 29.52 | 4.01 | Balance | 1060 | 39 | 0.6 | 0.7 | 13 | 67 |
| 23 | 49.02 | 48.81 | 0.21 | 29.52 | 4.01 | Balance | 2250 | 49 | 0.6 | 0.7 | 25 | 73 |
| 24 | 48.95 | 48.74 | 0.21 | 29.49 | 4.01 | Balance | 4010 | 41 | 1.7 | 0.5 | 8 | 78 |
| *25 | 49.12 | 48.91 | 0.21 | 29.50 | 3.99 | Balance | 5010 | 31 | 1.8 | 0.6 | 15 | 78 |
| *26 | 49.01 | 48.80 | 0.21 | 29.10 | 4.02 | Balance | 1990 | 5 | 0.5 | 0.7 | 12 | 68 |
| 27 | 48.95 | 48.74 | 0.21 | 29.05 | 3.99 | Balance | 2010 | 10 | 1.8 | 0.8 | 18 | 72 |
| 28 | 49.09 | 48.87 | 0.21 | 29.50 | 3.98 | Balance | 1990 | 54 | 1.4 | 0.6 | 23 | 67 |
| 29 | 49.09 | 48.88 | 0.21 | 29.50 | 3.99 | Balance | 1980 | 50 | 1.4 | 0.8 | 24 | 79 |
| 30 | 49.12 | 48.91 | 0.21 | 29.49 | 3.99 | Balance | 1990 | 220 | 1.2 | 0.9 | 14 | 69 |
| *31 | 49.13 | 48.92 | 0.21 | 29.51 | 4.02 | Balance | 2010 | 305 | 1.5 | 0.8 | 25 | 78 |
| 32 | 49.10 | 48.89 | 0.21 | 29.99 | 4.00 | Balance | 2000 | 32 | 0.1 | 0.8 | 29 | 66 |
| 33 | 49.12 | 48.91 | 0.21 | 30.04 | 3.99 | Balance | 1990 | 34 | 0.5 | 0.8 | 13 | 68 |
| 34 | 49.15 | 48.94 | 0.21 | 29.98 | 3.99 | Balance | 1980 | 46 | 1.0 | 0.8 | 18 | 75 |
| 35 | 49.10 | 48.88 | 0.21 | 30.02 | 4.02 | Balance | 2010 | 42 | 2.0 | 0.8 | 8 | 72 |
| *36 | 49.12 | 48.90 | 0.21 | 29.99 | 4.02 | Balance | 2010 | 46 | 4.0 | 0.8 | 19 | 77 |
| *37 | 49.14 | 48.92 | 0.21 | 29.99 | 0.00 | Balance | 1990 | 34 | 3.3 | 0.0 | 17 | 75 |
| 38 | 49.01 | 48.80 | 0.21 | 29.99 | 2.99 | Balance | 1990 | 44 | 1.9 | 0.5 | 19 | 74 |
| 39 | 49.09 | 48.88 | 0.21 | 29.21 | 4.01 | Balance | 2000 | 41 | 1.4 | 1.0 | 28 | 68 |
| 40 | 48.95 | 48.74 | 0.21 | 29.05 | 6.00 | Balance | 2010 | 34 | 0.8 | 1.0 | 30 | 74 |
| *41 | 49.11 | 48.90 | 0.21 | 30.00 | 7.00 | Balance | 1990 | 48 | 0.5 | 4.5 | 15 | 72 |
| *42 | 49.03 | 48.98 | 0.05 | 29.04 | 3.98 | Balance | 2010 | 46 | 0.6 | 0.5 | 29 | 77 |
| 43 | 48.98 | 48.91 | 0.07 | 28.95 | 4.01 | Balance | 2040 | 37 | 0.6 | 0.5 | 15 | 66 |
| 44 | 49.13 | 49.03 | 0.10 | 29.08 | 3.99 | Balance | 1980 | 41 | 0.6 | 0.5 | 30 | 77 |
| 45 | 49.08 | 48.78 | 0.30 | 29.01 | 4.01 | Balance | 2010 | 47 | 0.6 | 0.5 | 10 | 74 |
| 46 | 48.95 | 48.58 | 0.37 | 28.98 | 4.02 | Balance | 1980 | 42 | 0.6 | 0.5 | 9 | 69 |
| *47 | 49.11 | 48.71 | 0.40 | 29.60 | 3.98 | Balance | 2000 | 45 | 0.6 | 0.5 | 9 | 75 |
| 48 | 49.12 | 48.92 | 0.20 | 29.18 | 3.01 | Balance | 1980 | 39 | 0.5 | 0.5 | 3 | 45 |
| 49 | 49.10 | 48.89 | 0.21 | 28.98 | 3.03 | Balance | 2040 | 46 | 0.6 | 0.5 | 5 | 55 |
| 50 | 49.12 | 48.91 | 0.21 | 29.04 | 3.02 | Balance | 1950 | 40 | 0.5 | 0.5 | 10 | 81 |
| 51 | 49.13 | 48.93 | 0.20 | 29.13 | 3.08 | Balance | 1960 | 34 | 0.8 | 0.5 | 30 | 78 |
| 52 | 49.07 | 48.85 | 0.21 | 29.15 | 3.05 | Balance | 2010 | 31 | 0.4 | 0.5 | 50 | 55 |
| 53 | 48.95 | 48.75 | 0.20 | 29.80 | 3.04 | Balance | 2030 | 33 | 0.9 | 0.4 | 60 | 80 |
| 54 | 49.05 | 48.85 | 0.20 | 29.80 | 3.07 | Balance | 1960 | 38 | 1.0 | 0.8 | 10 | 5 |
| 55 | 49.08 | 48.87 | 0.21 | 29.03 | 3.04 | Balance | 1970 | 44 | 0.5 | 0.5 | 35 | 10 |
| 56 | 49.05 | 48.84 | 0.21 | 29.01 | 3.01 | Balance | 2010 | 37 | 0.8 | 0.3 | 25 | 20 |
| 57 | 49.06 | 48.85 | 0.21 | 29.10 | 3.01 | Balance | 2000 | 40 | 0.7 | 0.4 | 10 | 150 |
| 58 | 49.06 | 48.86 | 0.20 | 29.05 | 3.02 | Balance | 1960 | 42 | 0.8 | 0.4 | 10 | 305 |
| 59 | 49.05 | 48.83 | 0.21 | 29.80 | 3.08 | Balance | 2000 | 40 | 0.8 | 0.4 | 29 | 400 |
| 60 | 49.10 | 48.89 | 0.20 | 29.80 | 3.05 | Balance | 1970 | 40 | 1.0 | 0.8 | 21 | 20 |

TABLE 1-continued

| | | | | | | | | | | | | |
|---|---|---|---|---|---|---|---|---|---|---|---|---|
| 61 | 48.96 | 48.77 | 0.20 | 29.07 | 3.10 | Balance | 2010 | 43 | 0.5 | 0.5 | 35 | 150 |
| 62 | 49.09 | 48.88 | 0.21 | 29.04 | 3.00 | Balance | 1990 | 35 | 0.8 | 0.3 | 25 | 140 |
| 63 | 49.09 | 48.88 | 0.20 | 29.00 | 3.00 | Balance | 1970 | 31 | 0.7 | 0.4 | 10 | 80 |
| 64 | 48.98 | 48.78 | 0.21 | 29.15 | 3.00 | Balance | 2030 | 50 | 0.8 | 0.4 | 10 | 80 |
| 65 | 49.09 | 48.88 | 0.20 | 29.80 | 3.10 | Balance | 1970 | 42 | 0.8 | 0.4 | 29 | 99 |
| 66 | 49.08 | 48.88 | 0.20 | 29.80 | 3.10 | Balance | 1940 | 41 | 1.5 | 0.2 | 26 | 105 |
| 67 | 49.03 | 48.83 | 0.21 | 29.80 | 3.08 | Balance | 2010 | 45 | 1.2 | 0.3 | 32 | 97 |
| 68 | 49.06 | 48.86 | 0.20 | 29.80 | 3.01 | Balance | 1980 | 40 | 1.1 | 0.3 | 32 | 102 |
| 69 | 49.21 | 49.01 | 0.20 | 30.50 | 3.04 | Balance | 2060 | 30 | 0.8 | 0.3 | 28 | 110 |
| 70 | 49.23 | 49.03 | 0.20 | 30.50 | 3.04 | Balance | 1960 | 41 | 0.5 | 0.3 | 26 | 101 |
| 71 | 49.16 | 48.96 | 0.21 | 30.50 | 3.08 | Balance | 2040 | 45 | 1.5 | 0.2 | 26 | 103 |
| 72 | 49.19 | 48.98 | 0.21 | 30.50 | 3.09 | Balance | 2090 | 45 | 1.2 | 0.3 | 25 | 108 |
| 73 | 49.23 | 49.02 | 0.21 | 30.50 | 3.05 | Balance | 1900 | 45 | 0.8 | 0.2 | 32 | 97 |
| 74 | 49.20 | 48.99 | 0.21 | 30.50 | 3.00 | Balance | 2030 | 42 | 0.9 | 0.2 | 27 | 104 |
| 75 | 49.21 | 49.01 | 0.20 | 30.50 | 3.08 | Balance | 1950 | 38 | 0.8 | 0.3 | 31 | 98 |
| 76 | 49.17 | 48.97 | 0.20 | 30.50 | 3.01 | Balance | 1920 | 49 | 0.5 | 0.3 | 34 | 104 |
| 77 | 49.19 | 48.98 | 0.21 | 30.50 | 3.02 | Balance | 1970 | 35 | 0.8 | 0.2 | 30 | 105 |
| 78 | 49.15 | 48.95 | 0.20 | 30.50 | 3.09 | Balance | 1900 | 42 | 1.1 | 0.3 | 28 | 103 |
| *79 | 49.01 | 48.80 | 0.21 | 29.99 | 3.01 | Balance | 1980 | 44 | 1.0 | 2.1 | 19 | 71 |

| Sample | S ppm | Pores not smaller than 5 μm — | Percentage of pores not larger than 2 μm % | Relative permeability — | Curie point ° C. | Three-point bending strength MPa | Abnormal grain growth — |
|---|---|---|---|---|---|---|---|
| *1 | 13 | Observed | 77 | 850 | 206 | 171 | Excellent |
| 2 | 22 | Not observed | 80 | 1105 | 209 | 185 | Excellent |
| 3 | 15 | Not observed | 85 | 1129 | 202 | 198 | Excellent |
| 4 | 6 | Not observed | 90 | 1170 | 177 | 200 | Excellent |
| 5 | 21 | Not observed | 95 | 1310 | 175 | 210 | Excellent |
| 6 | 19 | Not observed | 95 | 1323 | 172 | 220 | Excellent |
| 7 | 19 | Observed | 70 | 1260 | 168 | 181 | Excellent |
| *8 | 14 | Observed | 65 | 850 | 166 | 170 | Excellent |
| *9 | 25 | Observed | 85 | 755 | 219 | 175 | Excellent |
| 10 | 11 | Not observed | 80 | 1005 | 197 | 181 | Excellent |
| 11 | 25 | Observed | 75 | 1803 | 132 | 180 | Excellent |
| 12 | 20 | Observed | 75 | 2120 | 100 | 180 | Excellent |
| *13 | 19 | Observed | 80 | 2320 | 66 | 176 | Excellent |
| *14 | 25 | Observed | 75 | 3530 | −89 | 175 | Excellent |
| *15 | 8 | Observed | 50 | 700 | 190 | 148 | Excellent |
| 16 | 28 | Observed | 80 | 1230 | 179 | 175 | Excellent |
| 17 | 15 | Not observed | 90 | 1420 | 176 | 201 | Excellent |
| 18 | 10 | Not observed | 91 | 1530 | 169 | 210 | Excellent |
| *19 | 14 | Not observed | 91 | 990 | 160 | 165 | Excellent |
| *20 | 25 | Observed | 80 | 860 | 186 | 171 | Excellent |
| 21 | 29 | Observed | 69 | 1036 | 187 | 172 | Excellent |
| 22 | 14 | Not observed | 88 | 1146 | 188 | 189 | Excellent |
| 23 | 23 | Not observed | 89 | 1205 | 187 | 188 | Excellent |
| 24 | 10 | Not observed | 70 | 1082 | 189 | 175 | Excellent |
| *25 | 20 | Not observed | 90 | 840 | 187 | 170 | Excellent |
| *26 | 27 | Not observed | 80 | 953 | 197 | 190 | Excellent |
| 27 | 19 | Observed | 69 | 1044 | 199 | 181 | Excellent |
| 28 | 24 | Observed | 80 | 1082 | 187 | 179 | Excellent |
| 29 | 22 | Observed | 82 | 1100 | 187 | 180 | Excellent |
| 30 | 19 | Not observed | 80 | 1004 | 187 | 184 | Excellent |
| *31 | 18 | Observed | 70 | 980 | 186 | 173 | Excellent |
| 32 | 25 | Not observed | 95 | 1355 | 176 | 210 | Excellent |
| 33 | 26 | Not observed | 90 | 1349 | 175 | 215 | Excellent |
| 34 | 18 | Not observed | 87 | 1270 | 175 | 188 | Excellent |
| 35 | 12 | Observed | 70 | 1046 | 175 | 170 | Excellent |
| *36 | 11 | Observed | 68 | 973 | 176 | 163 | Excellent |
| *37 | 22 | Observed | 66 | 700 | 190 | 160 | Excellent |
| 38 | 26 | Observed | 70 | 1005 | 181 | 172 | Excellent |
| 39 | 13 | Not observed | 69 | 1068 | 193 | 178 | Excellent |
| 40 | 24 | Not observed | 95 | 1120 | 191 | 202 | Excellent |
| *41 | 15 | Not observed | 90 | 980 | 165 | 168 | Excellent |
| *42 | 17 | Not observed | 85 | 920 | 198 | 190 | Excellent |
| 43 | 6 | Not observed | 82 | 1101 | 200 | 190 | Excellent |
| 44 | 11 | Not observed | 95 | 1120 | 196 | 203 | Excellent |
| 45 | 11 | Not observed | 90 | 1104 | 198 | 204 | Excellent |
| 46 | 30 | Not observed | 82 | 1112 | 200 | 192 | Excellent |
| *47 | 6.8 | Not observed | 88 | 980 | 184 | 206 | Excellent |
| 48 | 30 | Not observed | 90 | 1020 | 197 | 203 | Excellent |
| 49 | 5 | Not observed | 80 | 1141 | 202 | 190 | Excellent |
| 50 | 10 | Not observed | 70 | 1147 | 200 | 187 | Excellent |
| 51 | 12 | Not observed | 95 | 1127 | 198 | 201 | Excellent |
| 52 | 14 | Not observed | 90 | 1158 | 199 | 204 | Excellent |
| 53 | 79 | Observed | 80 | 1131 | 185 | 180 | Good |
| 54 | 90 | Observed | 70 | 1088 | 185 | 187 | Excellent |
| 55 | 40 | Not observed | 95 | 1147 | 202 | 203 | Excellent |
| 56 | 20 | Not observed | 95 | 1147 | 202 | 200 | Excellent |

TABLE 1-continued

|  |  |  |  |  |  |  |  |
|---|---|---|---|---|---|---|---|
| 57 | 80 | Not observed | 95 | 1144 | 200 | 201 | Excellent |
| 58 | 89 | Not observed | 95 | 1141 | 202 | 200 | Excellent |
| 59 | 101 | Not observed | 95 | 1141 | 185 | 183 | Good |
| 60 | 3 | Observed | 82 | 1088 | 185 | 186 | Excellent |
| 61 | 5 | Not observed | 92 | 1154 | 201 | 203 | Excellent |
| 62 | 25 | Not observed | 94 | 1151 | 202 | 200 | Excellent |
| 63 | 51 | Not observed | 93 | 1151 | 203 | 201 | Excellent |
| 64 | 108 | Not observed | 88 | 1141 | 199 | 195 | Excellent |
| 65 | 150 | Not observed | 84 | 1141 | 185 | 175 | Good |
| 66 | 26 | Observed | 75 | 1411 | 185 | 178 | Excellent |
| 67 | 34 | Observed | 82 | 1440 | 185 | 179 | Excellent |
| 68 | 28 | Observed | 80 | 1302 | 185 | 178 | Excellent |
| 69 | 30 | Observed | 90 | 1250 | 167 | 194 | Excellent |
| 70 | 30 | Observed | 85 | 1320 | 167 | 192 | Excellent |
| 71 | 35 | Observed | 70 | 1411 | 167 | 175 | Excellent |
| 72 | 35 | Observed | 50 | 1440 | 167 | 178 | Excellent |
| 73 | 31 | Observed | 30 | 1363 | 167 | 191 | Excellent |
| 74 | 31 | Observed | 10 | 1250 | 167 | 199 | Excellent |
| 75 | 32 | Not observed | 95 | 1202 | 167 | 208 | Excellent |
| 76 | 29 | Not observed | 90 | 1308 | 167 | 203 | Excellent |
| 77 | 31 | Not observed | 80 | 1306 | 167 | 190 | Excellent |
| 78 | 32 | Not observed | 70 | 1302 | 167 | 178 | Excellent |
| *79 | 26 | Observed | 70 | 980 | 181 | 169 | Excellent |

In Table 1, asterisked samples are comparative examples outside the scope of the present disclosure.

As is clear from Table 1, in Samples 2 to 7, 10 to 12, 16 to 18, 21 to 24, 27 to 30, 32 to 35, 38 to 40, 43 to 46, and 48 to 78, which contain Fe, Mn, Zn, Cu, Ni, Zr, and Al in a predetermined range and have a pore fraction of 2.0% or less and a Cu segregation fraction of 2.0% or less, ferrite sintered bodies satisfying all of a relative permeability $\mu$ of 1,000 or more, a Curie point of 100° C. or higher, and a three-point bending strength of 170 MPa or more are obtained.

However, in Samples 1, 8, 9, 13 to 15, 19, 20, 25, 26, 31, 36, 37, 41, 42, 47, and 79, at least one of a relative permeability $\mu$ of 1,000 or more, a Curie point of 100° C. or higher, and a three-point bending strength of 170 MPa or more is not satisfied. In, for example, Samples 15 and 37, the content of CuO is 0 mol % and therefore it is conceivable that sintering is unlikely to occur and the pore fraction has increased. In Samples 19 and 41, the content of CuO is high and therefore it is conceivable that the Cu segregation fraction has increased. In Sample 79, the concentration of oxygen during calcination is low and therefore it is conceivable that the Cu segregation fraction has increased.

In particular, in Samples 2 to 6, 17, 18, 22, 23, 32 to 34, 40, 43, 44 to 46, 49 to 52, 55 to 58, 61 to 64, 69, 70, and 73 to 77, which contain 5 ppm to 50 ppm P in terms of $P_2O_5$, 10 ppm to 305 ppm Cr in terms of $Cr_2O_3$, and 5 ppm to 108 ppm S per 100 parts by weight of the sum of the amounts of contained $Fe_2O_3$, $Mn_2O_3$, ZnO, CuO, and NiO and have a pore fraction of 1.0% or less, ferrite sintered bodies satisfying a relative permeability $\mu$ of 1,100 or more and a three-point bending strength of 185 MPa or more are obtained.

Especially, in Samples 4 to 6, 17, 18, 32, 33, 40, 44, 45, 51, 52, 55 to 58, 61 to 63, 75, and 76, which have no pore not smaller than 5 μm in terms of equivalent circle diameter and in which the number of pores not larger than 2 μm in terms of equivalent circle diameter accounts for 90% or more of the number of all pores, ferrite sintered bodies satisfying a three-point bending strength of 200 MPa or more are obtained.

Coil Component

A coil component according to the present disclosure includes the ferrite sintered body according to the present disclosure as a magnetic core. In the coil component according to the present disclosure, a wire is wound around the magnetic core.

In the case of manufacturing the coil component according to the present disclosure, after a granulated powder obtained by the method described in above-mentioned "Ferrite Sintered Body" is molded into a predetermined shape, the ferrite sintered body is obtained. The obtained ferrite sintered body is used as a magnetic core and outer electrodes are formed thereon. Thereafter, a wire such as a Cu wire is wound around the ferrite sintered body and is connected to the outer electrodes. A top plate or the like is placed on the ferrite sintered body as required, whereby the coil component is obtained.

In the coil component according to the present disclosure, the shape of the magnetic core is not particularly limited and may be, for example, substantially a drum shape, a donut shape, an E-shape, an I-shape, or the like.

Figure 5:
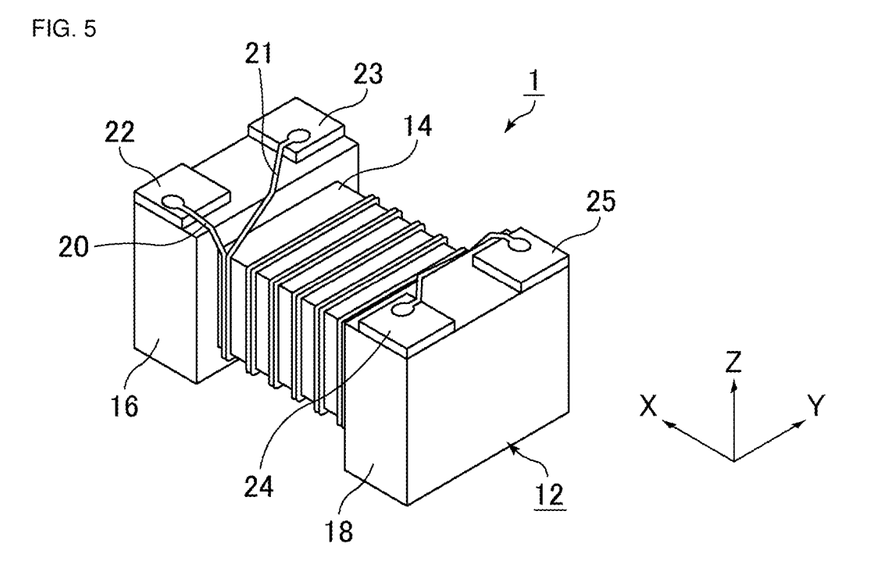
FIG. 5 is a schematic perspective view of an example of a coil component according to the present disclosure.

FIG. 5 is a schematic perspective view of an example of the coil component according to the present disclosure.

As shown in FIG. 5, a coil component 1 includes a magnetic core 12 which is substantially drum-shaped, wires 20 and 21, and outer electrodes 22, 23, 24, and 25. The magnetic core 12 is composed of the ferrite sintered body according to the present disclosure.

As shown in FIG. 5, in the coil component 1, the two wires 20 and 21 are wound around the magnetic core 12. However, in the coil component according to the present disclosure, the number of wires is not limited to two and may be one or three or more.

As shown in FIG. 5, the magnetic core 12 includes a core section 14 and flange sections 16 and 18. The core section 14 is integral with the flange sections 16 and 18.

The core section 14 is a member which extends in an X-axis direction and which has substantially a prism shape. Incidentally, the core section 14 is not limited to substantially the prism shape and may have substantially a column shape.

The flange sections 16 and 18 are placed at both ends of the core section 14 in the X-axis direction (extending direction). In particular, the flange section 16 is placed at an end of the core section 14 on the positive side of the X-axis direction and the flange section 18 is placed at the other end of the core section 14 on the negative side of the X-axis direction.

The flange section 16 has a shape protruding from the core section 14 at least to the positive side of a Z-axis direction. In this embodiment, the flange section 16 protrudes to the positive and negative sides of the Z-axis direction and the positive and negative sides of a Y-axis direction and therefore has a shape protruding in all directions perpendicular to the X-axis direction.

The flange section 18 has a shape protruding from the core section 14 at least to the positive side of the Z-axis direction. In this embodiment, the flange section 18 protrudes to the positive and negative sides of the Z-axis direction and the positive and negative sides of the Y-axis direction and therefore has a shape protruding in all directions perpendicular to the X-axis direction.

As shown in FIG. 5, the outer electrodes 22 and 23 are placed on an end surface of the flange section 16 that is located on the positive side of the Z-axis direction. The outer electrodes 24 and 25 are placed on an end surface of the flange section 18 that is located on the positive side of the Z-axis direction. When the coil component 1 is mounted on, for example, a circuit board, the outer electrodes 22, 23, 24, and 25 are electrically connected to electrodes of the circuit board. The outer electrodes 22, 23, 24, and 25 are made of, for example, a Ni alloy such as Ni—Cr or Ni—Cu, Ni, Ag, Cu, Sn, or the like.

As shown in FIG. 5, the wires 20 and 21 are conducting wires wound around the core section 14. The wires 20 and 21 have a configuration in which, for example, a core wire mainly containing a conductive material such as Cu or Ag is covered by an insulating material such as polyurethane.

An end of the wire 20 that is located on the positive side of the X-axis direction is connected to the outer electrode 22 and the other end of the wire 20 that is located on the negative side of the X-axis direction is connected to the outer electrode 24. An end of the wire 21 that is located on the positive side of the X-axis direction is connected to the outer electrode 23 and the other end of the wire 21 that is located on the negative side of the X-axis direction is connected to the outer electrode 25.

The coil component 1, which is shown in FIG. 5, is manufactured, for example, as described below.

First, a ferrite powder which is material of the magnetic core 12 is prepared. The prepared ferrite powder is filled in a female die. The ferrite powder filled in the female die is pressed with a male die, whereby the core section 14 and the flange sections 16 and 18 are formed.

After the core section 14 and the flange sections 16 and 18 are formed, calcination is performed, whereby the magnetic core 12 is obtained. Barrel polishing may be performed as required.

Subsequently, the outer electrodes 22 and 23 are formed on the flange section 16 of the magnetic core 12 and the outer electrodes 24 and 25 are formed on the flange section 18 of the magnetic core 12. For example, a conductive paste containing Ag or the like is applied to end surfaces of the flange sections 16 and 18 and is baked such that underlying metal layers are formed on the end surfaces thereof, followed by forming coating films made of a Ni alloy or the like on the underlying metal layers by electrolytic plating or the like.

Next, the wires 20 and 21 are wound around the core section 14 of the magnetic core 12. In this operation, a predetermined amount of each of both ends of the wires 20 and 21 are extended from the core section 14. Finally, extended portions of the wire 20 are connected to the outer electrodes 22 and 24 and extended portions of the wire 21 are connected to the outer electrodes 23 and 25 by thermal pressure bonding or the like. Through the above steps, the coil component 1 can be manufactured.

In the coil component according to the present disclosure, a top plate (hereinafter also referred to as the magnetic plate) made of a magnetic material may be placed on a surface opposite to a mounting surface. Alternatively, a magnetic layer made of resin containing a magnetic material may be placed on the surface opposite to the mounting surface. Placing the magnetic plate or the magnetic layer thereon enables the leakage of a portion or the whole of a magnetic field generated by a wire outside to be blocked. Therefore, the interference between a wire and electronic component present around the coil component is unlikely to occur.

The magnetic plate or the magnetic layer may be placed over the surface opposite to the mounting surface or may be placed on a portion of the surface opposite to the mounting surface among surfaces of the magnetic core.

The magnetic plate may be composed of the ferrite sintered body according to the present disclosure or may be composed of another magnetic material. The magnetic plate may further contain an organic material, metal, or the like. The magnetic plate may contain a nonmagnetic ceramic.

A magnetic material forming the magnetic layer may be the same as or different from the magnetic material forming the ferrite sintered body according to the present disclosure. Examples of the resin forming the magnetic layer include polyimide resins and epoxy resins. The magnetic layer may further contain an organic material, metal, or the like. The magnetic layer may contain a nonmagnetic ceramic.

A coil component according to the present disclosure is not limited to the above-mentioned embodiment and can be modified or varied in various ways within the scope of the present disclosure.

In a coil component according to the present disclosure, the size (diameter), number of turns, and cross-sectional shape, number of wires are not particularly limited and may be appropriately varied depending on desired characteristics and mounting locations. Furthermore, the positions and number of outer electrodes can be appropriately set depending on the number of wires and applications.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A ferrite sintered body containing:
   Fe;
   Mn;
   Zn;
   Cu; and
   Ni,
   wherein when Fe, Mn, Zn, Cu, and Ni are converted into $Fe_2O_3$, $Mn_2O_3$, ZnO, CuO, and NiO, respectively, and a sum of contents of $Fe_2O_3$, $Mn_2O_3$, ZnO, CuO, and NiO is 100 mol %, a sum of the contents of $Fe_2O_3$ and $Mn_2O_3$ is 48.47 mol % to 49.93 mol %, the content of $Mn_2O_3$ is 0.07 mol % to 0.37 mol %, the content of ZnO is 28.95 mol % to 33.50 mol %, and the content of CuO is 2.98 mol % to 6.05 mol %,
   102 ppm to 4,010 ppm Zr in terms of $ZrO_2$ and 10 ppm to 220 ppm Al in terms of $Al_2O_3$ are further contained per 100 parts by weight of a sum of amounts of contained $Fe_2O_3$, $Mn_2O_3$, ZnO, CuO, and NiO, and in a cross section of the ferrite sintered body, an area fraction of pores and an area fraction of segregations containing Cu are 2.0% or less.

2. The ferrite sintered body according to claim 1, further containing:

P, Cr, and S.

3. The ferrite sintered body according to claim 1, further containing:

5 ppm to 50 ppm P in terms of $P_2O_5$;

10 ppm to 305 ppm Cr in terms of $Cr_2O_3$; and 5 ppm to 108 ppm S per 100 parts by weight of the sum of the amounts of contained $Fe_2O_3$, $Mn_2O_3$, ZnO, CuO, and NiO, wherein in a cross section of the ferrite sintered body, an area fraction of pores is 1.0% or less.

4. The ferrite sintered body according to claim 3, wherein in a cross section of the ferrite sintered body, there are no pore not smaller than 5 μm in terms of equivalent circle diameter and the number of pores not larger than 2 μm in terms of equivalent circle diameter accounts for 90% or more of the number of all pores.

5. A coil component comprising the ferrite sintered body according to any one of claim 1 as a magnetic core.

6. A coil component comprising the ferrite sintered body according to any one of claim 2 as a magnetic core.

7. A coil component comprising the ferrite sintered body according to any one of claim 3 as a magnetic core.

8. A coil component comprising the ferrite sintered body according to any one of claim 4 as a magnetic core.

* * * * *